US006977886B2

(12) United States Patent
Tada

(10) Patent No.: US 6,977,886 B2
(45) Date of Patent: Dec. 20, 2005

(54) TRANSMITTER FOR AUTOMATICALLY CHANGING TRANSMISSION DATA TYPE WITHIN SPECIFIED BAND

(75) Inventor: Katsuyuki Tada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 943 days.

(21) Appl. No.: 09/777,171

(22) Filed: Feb. 5, 2001

(65) Prior Publication Data

US 2002/0034259 A1 Mar. 21, 2002

(30) Foreign Application Priority Data

Sep. 21, 2000 (JP) ............................ 2000-286372

(51) Int. Cl.[7] ................................................ H04L 1/00

(52) U.S. Cl. ...................... 370/216; 370/242; 370/252; 375/295; 359/118; 359/180

(58) Field of Search ................................ 370/216, 218, 370/222, 228, 242, 243, 244, 245, 246, 252; 375/295; 359/180, 188, 109, 110, 118

(56) References Cited

U.S. PATENT DOCUMENTS

| | | | | |
|---|---|---|---|---|
| 5,812,524 | A * | 9/1998 | Moran et al. | 370/228 |
| 6,097,696 | A * | 8/2000 | Doverspike | 370/216 |
| 6,611,565 | B1 * | 8/2003 | Bada et al. | 375/295 |
| 6,678,256 | B1 * | 1/2004 | Sato | 370/310.1 |

FOREIGN PATENT DOCUMENTS

| | | | |
|---|---|---|---|
| JP | 08-163067 | 6/1996 | H04J 3/00 |
| JP | 09-135243 | 5/1997 | H04L 12/28 |

* cited by examiner

*Primary Examiner*—Dang Ton
*Assistant Examiner*—Shick Hom
(74) *Attorney, Agent, or Firm*—Katten Muchin Rosenman LLP

(57) ABSTRACT

The transmitter comprises: a detection part for detecting an identifier (CI-ID) for identifying a band use to be received; an identifier setting part for previously setting the identifier (CI-ID) for identifying the expected band use; and a control part for monitoring the detection part and identifier setting part in each minimum unit of a line, wherein the control part periodically monitors the identifier for identifying the band use to be received in the previously defined band, and when the identifier is different from the identifier for identifying the expected band use, the identifier for identifying the expected band use is re-established as the identifier for identifying the band use to be received.

5 Claims, 8 Drawing Sheets

TRANSMITTER FOR AUTOMATICALLY CHANGING TRANSMISSION DATA TYPE WITHIN SPECIFIED BAND

BACKGROUND OF THE INVENTION

1. Field of the Invention

The present invention relates generally to a transmitter constituting a basic transmission path (network), and more particularly to a transmitter which has an optical line interface as a service interface, and enables a change of a path line connection by a cross connection switch.

2. Description of the Related Arts

In recent years, a ratio of IP (internet protocol) data abruptly increases in an increasing digital data transmission.

An IP data network is characterized in having an aspect that a service provider other than an operational company holding a basic transmission path (network) operates the network.

FIG. 1 is a configuration diagram of a basic network 1 and an IP data network 2. In the basic network 1, a plurality of transmitters NE (network equipment): A to C are connected between a transmission path (ac), a transmission path (ab), and a transmission path (bc).

The plurality of transmitters NE (network equipment): A to C have each optical line transmission and reception parts a1, a2, b1, b2, c1, c2 for accomodating a service interface in a portion of connecting with the transmission path. Furthermore, the transmitters NE (network equipment): A and C have optical line transmission and reception parts a3, c3 for accomodating the service interface in a portion of connecting with the IP data network 2.

Each optical line transmission and reception part further has a MUX (multiplex)/DMUX (demultiplex), and it is possible to multiplex in a time division the plurality of service interfaces to be accomodated.

The basic network 1 is interfaced with the IP data internet via an optical line (OC3/OC12/OC48, etc.). In the example of FIG. 1, the interface is made via interface lines 3, 4 of the OC12 (600M: ST12 band width).

Furthermore, the transmitters NE: A to C have cross-connection parts (a4, b4, c4 in FIG. 1) which can optionally connect with a path transmission path, and control parts (a5, b5, c5 in FIG. 1) for controlling correspondingly the cross-connection parts a4, b4, c4.

IP units D, E in FIG. 1 are a router, an edge switch, or the like constituting the IP data network 2, and are maintained and operated by the service provider holding the IP data network 2.

Each transmitter NE has a switch SW (c6 in FIG. 1) for relieving a corresponding path line when a fault (an optical line fault, a human fault due to an error connection of the cross-connection) within the basic network occurs, and it is possible to construct a redundancy of the path line.

A meshing region of the transmission paths (ab, bc, ac) in FIG. 1 indicates a band allocated in the basic network 1 as a communication path between the IP unit D and IP unit E (reference symbols Pac, Pab, Pbc in FIG. 1).

Furthermore, transmitters NE: A, and NE: C receive also optical lines af, cg with a conventional voice switch (F/G in FIG. 1).

According to a change of a type of service interface received by the IP units D, E, or a reception data amount, it is possible to use 12×STS1 in the OC 12 interfaces 3, 4 in FIG. 1 in free comparison with STS1/STS3C (3×STS1)/STS12C (12×STS1). However, it is impossible to exceed 12×STS1.

As shown in FIG. 1, in order to take a redundancy, the path line which is transmitted from the IP unit D is transmitted to both a direction of a transmission path (ab) and a direction of a transmission path (ac). The path line received from both the transmission paths is selected by a switch SW part c6 in the transmission unit NE: C, and reception data are sent to the interface line 4 with the IP unit E.

In FIG. 1, in the transmitter NE: B, in order to relay the path line between the IP units D and E, the band allocated to the path is controlled by a control part b5 for the cross-connection b4, thereby securing the band.

At this time, the allocation (a ratio of STS1/STS3C/STS12C) within the band (12×STS1) allocated between the IP units D and E has to be established equally with respect to all the transmitters NE: A to C within the basic network 1.

This establishment is indicated in any type of path formats of STS1/STS3C/STS12C by a CI (concatenation)-ID. This CI-ID is relayed by all the transmitters NE of the basic network 1 between the IP units D and E.

Furthermore, the CI-ID has to agree an expectation of all the path line transmission part of the transmitter NE with the reception part thereof. Accordingly, in the case where, in the prior art, the expectation CI-ID at a reception side does not agree with a reception CI-ID, it is judged that an error connection is made in the cross-connection part, etc. in the transmission path, and a relief is made by the SW part c6, etc. to take a redundant protection.

On the other hand, since conventional voice data transmission data are based on a long-termed transmission path plan such as an installation plan of a SW (switcher), a band change was rare. On the contrary, according to an increase in a recent abrupt IP network and a change to a new type of the IP unit, there are many cases where such an optional change occurs that the allocation of a STS band within the optical line of the OC 12, etc. as the service interface is changed frequently.

However, in the conventional unit shown in FIG. 1, each time such a change is necessary, the CI-ID of the respective transmitters NE: A to C within the basic network has been changed. For this reason, maintenance costs of the basic network 1 increase, and such a problem occurs.

SUMMARY OF THE INVENTION

It is therefore an object of the present invention to provide a transmitter which automatically follows the case where a method for using the band in the optical line is changed, and removes a necessity of human re-establishment, and automatically changes a transmission data type within a specified band, and a network system using the same.

In order to achieve the above object, according to an aspect of the present invention there is provided a transmitter, comprising a detection part for detecting an identifier for identifying a band use to be received; an identifier setting part for previously setting the identifier for identifying the expected band use; and a control part for monitoring the detection part and identifier setting part in each minimum unit of a line, wherein the control part periodically monitors the identifier for identifying the band use to be received in the previously defined band, and when the received identifier is different from the identifier for identifying the expected band use, the identifier for identifying the expected band use is re-established as the identifier for identifying the band use to be received.

Preferably, the transmitter further comprises a fault detection part for detecting a path fault, wherein when the identifier for identifying the expected band use is re-established as the identifier for identifying the band use to be received, an alarm of an LOP (Loss of Pointer) which is detected by the fault detection part is masked.

Preferably, the transmitter further comprises a fault detection part for storing trace information to be transmitted from a terminal point in each minimum unit of the line, and when the fault detection part for detecting the path fault is provided, and the identifier for identifying the expected band use is re-established as the identifier for identifying the band use to be received, for identifying a change of the use within the band or an error cross-connection according to presence or absence of a change of the trace information.

Preferably, the control part notices to a maintainer when an accumulated bit error number, an error generation second number, and an error generation second number of a fixed value or more in a predetermined period reach a predetermined value or over.

Preferably, the transmitter further comprises means for judging a bit error number of a path line according to the identifier for identifying the judged band use.

BRIEF DESCRIPTION OF THE DRAWINGS

The above and other aspects, objects, features and advantages of the present invention will become more apparent from the following description of the embodiments when read in conjunction with the accompanying drawings, in which.

DESCRIPTION OF THE PREFERRED EMBODIMENTS

Figure 1:
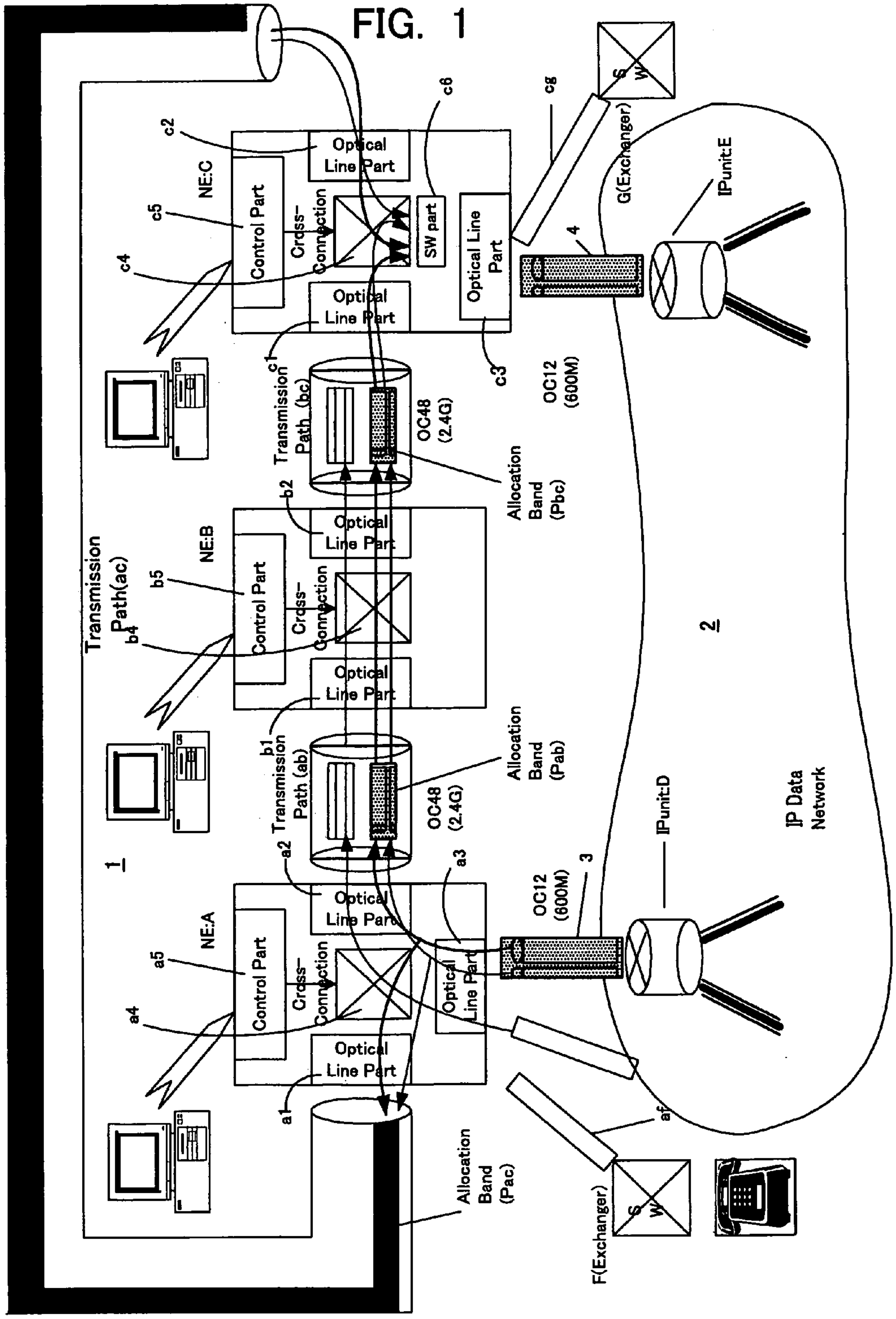
FIG. 1 is a configuration diagram of a basic network 1 and an IP data network 2.
Figure 2:
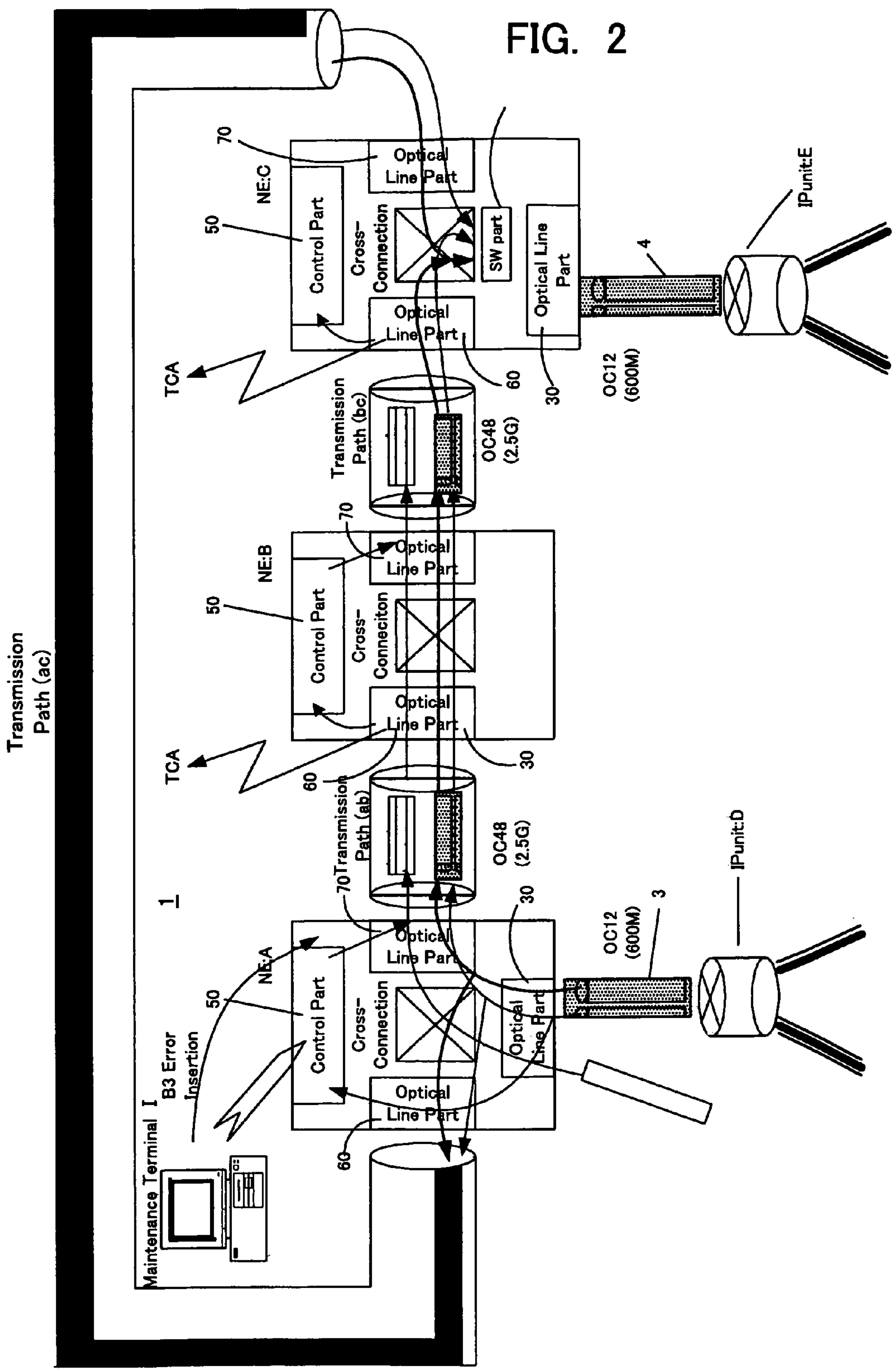
FIG. 2 is a diagram showing an embodiment according to the present invention, a hardware configuration in a network having basically the same configuration in FIG. 1.

FIG. 2 is a diagram showing an embodiment of the present invention, and a hardware configuration in a network is basically same with the configuration in FIG. 1. Accordingly, the configuration in a plurality of transmitters NE: A, B, C is substantially same.

Figure 3:
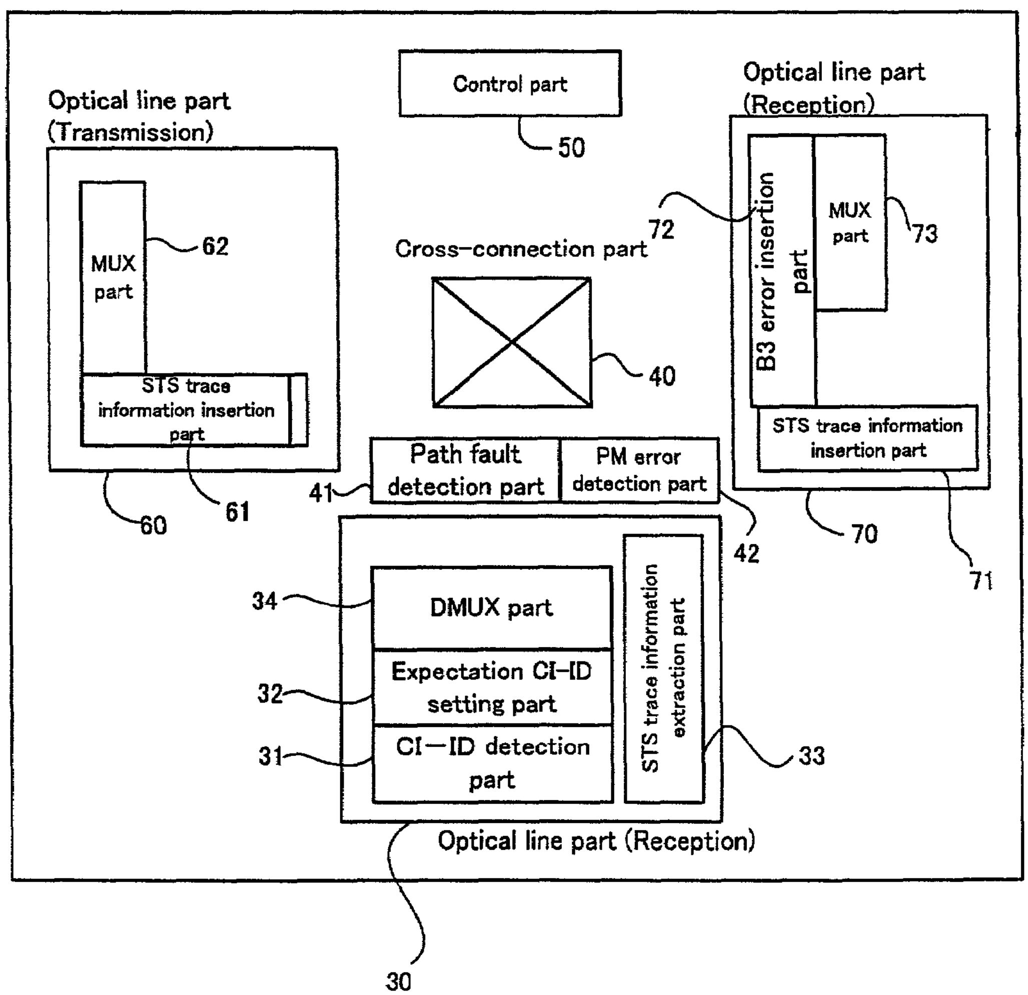
FIG. 3 is a diagram showing a block configuration of the transmitter NE: A.
Figure 4:
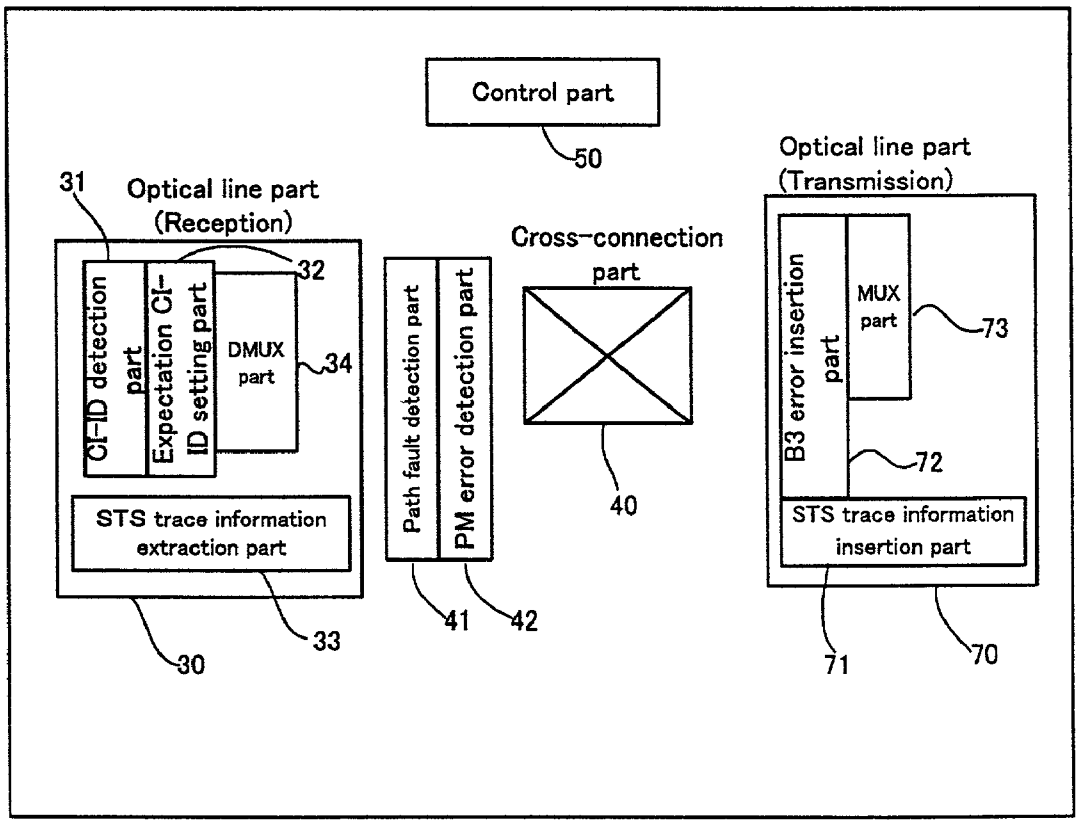
FIG. 4 is a diagram showing a block configuration of the transmitter NE: B.
Figure 5:
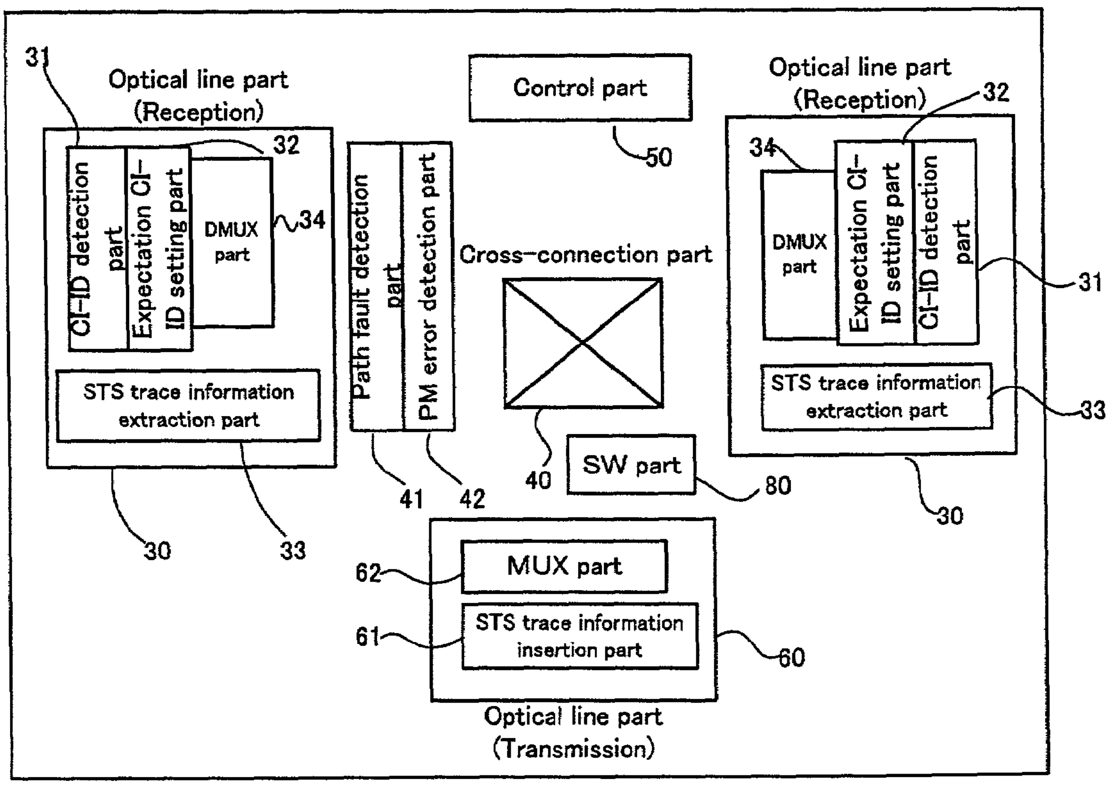
FIG. 5 is a diagram showing a block configuration of the transmitter NE: C.

Here, only a part required for assuming a data transmission in a direction of an IP unit D→the transmitter NE: A→B→C→the IP unit E is extracted, and each block configuration of the transmitters NE: A, B, C corresponding to FIGS. 3, 4, and 5 is shown.

In the transmitter NE: A shown in FIG. 3, a reception side of an optical line 30 as a service interface has a CI-ID detection part 31 for detecting CI-ID showing a band for use in data to be received from an IP unit C. This CI-ID detection part 31 has a function of detecting a Hn byte in a SONET frame.

Furthermore, a reception side of the optical line part 30 has an expectation CI-ID setting part 32, a STS trace information extraction part 33, and further a DMUX part 34 for generating a connection basic signal of a cross-connection part 40.

The STS trace information extraction part 33 extracts a terminal point in each of specified STSs as minimum unit of a line, for example STS trace information as trace information to be transmitted from an IP unit D. FIG. 6 is a diagram for explaining J1 byte in the SONET frame.

Figure 6A:
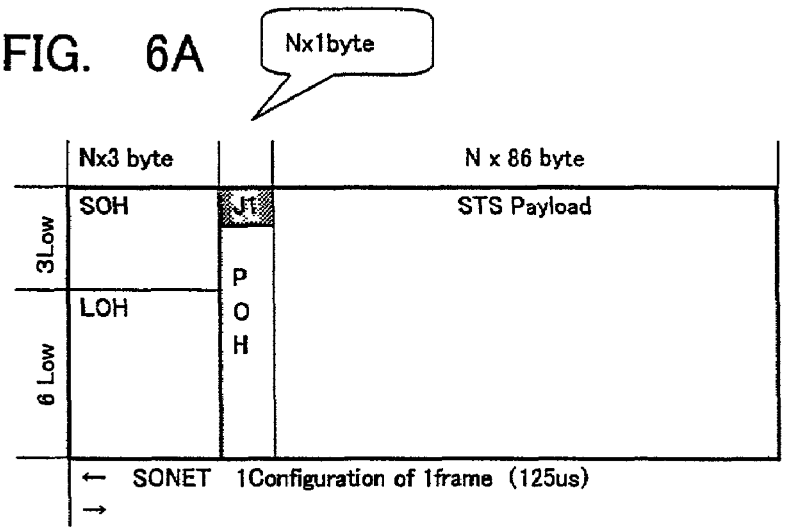
FIG. 6 is a diagram for explaining J1 byte in a SONET frame.

FIG. 6A shows a configuration of 1 frame of SONET, and shows a position of JI byte (to be N=12 in the case of OC12) in a STS-N frame. The n-th J1 byte is allocated to each STS1 path line.

Figure 6B:
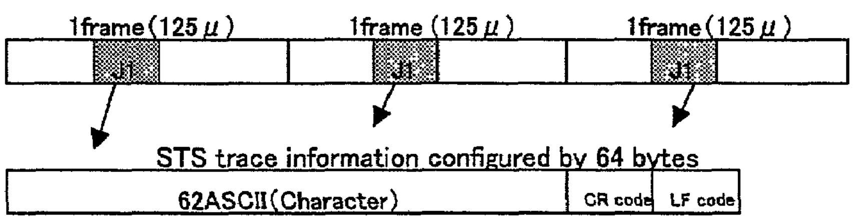

As shown in FIG. 6B, in STS trace information, the corresponding J1 byte in the SONET frame is constituted of 64 bytes. In FIG. 6B, 62ASCII (American Standard Code for Information Interchange) can be freely defined by a user. A 63-byte-th part is a check code, and a 64-byte-th part is an LF code, which is a frame code defining a frame configuration (SONET GR253 standard).

Figure 6C:
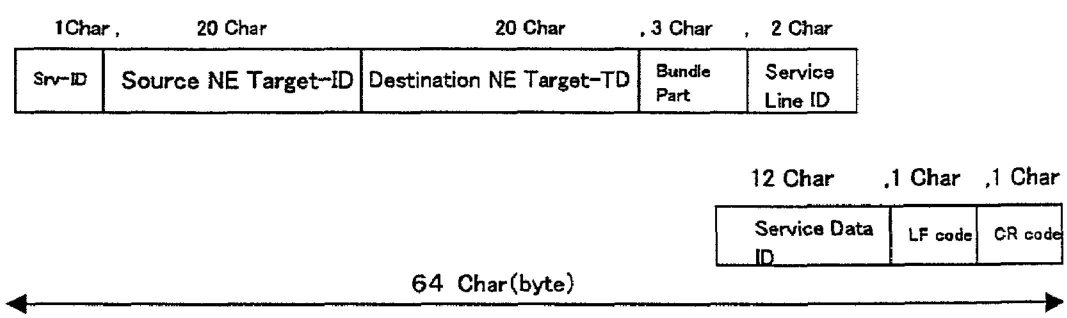

In FIG. 6C, data configuring STS1 trace information have contents of a next definition.

Srv-ID indicates a target to automatically change a data type, as a bundle service ID.

S-TID is an identification ID of the transmitter NE which inserts corresponding path line data into a basic transmission path (in FIG. 2, for example, the transmitter NE: ID of A).

D-ID is an identification ID of the transmitter NE which drops corresponding path line data from the basic transmission path (in FIG. 2, for example, the transmitter NE: ID of C).

A bundle number is the number of STS1 band which is defined as a bundle service (012 in the case of FIG. 2).

A service line ID is an identification ID of the optical line part 30 in the transmitter NE: A in FIG. 2.

A service data ID is an ID to be allocated to each of specified service interfaces (in FIG. 2, for example, the identification ID to be allocated to the IP unit D).

The LF code is a frame code of the STS trace information.

A CR code is a check code of the STS trace information.

When the bundle service is defined in advance, in each control part 50 of the transmitters NE: A, B, C, the STS trace information as in the above example is established and stored in advance in STS trace information insertion parts 61, 71.

Returning to FIG. 3 for explanation, the reception side of the optional line part 30 receives the CI-ID specifying the band defined in advance from the IP unit C as a configuration of the expected band. The expectation CI-ID and reception CI-ID which have been previously established in an expectation CI-ID setting part 32 are compared with each other. In the case of disagreement, a reception path abnormality alarm (LOP: Loss of Pointer) is detected.

The CI-ID detection part 31 and expectation CI-ID setting part 32 are monitored in each minimum unit (STS1) by the control part 50, and can be controlled in each minimum unit (STS1). That is, a CPU is mounted in the control part 50, and control of maintenance setting operation is analyzed, and it is possible to monitor control of the expectation CI-ID setting part 32 or the reception CI-ID.

Conventionally, justifiability of the reception data is judged by referencing the established CI-ID, but according to the present invention, such the specified service interface (an interface handling the IP data) has been in advance defined at a point of time of initial installation (a beforehand definition of the STS band in a meshing part in FIG. 2 is called a bundle service), and the defined band periodically monitors the reception CI-ID by the CPU of the control part 50.

In the case where the CI-ID is changed, the expectation CI-ID is instantaneously re-established, whereby the path line is transmitted to the basic transmission path as normal data.

The transmission side of an optical line part 60 to a cross-connection part 40 and the basic network 1 transmits data received at a side of reception of the optical line part 30 to the basic transmission path in transparency.

Figure 7:
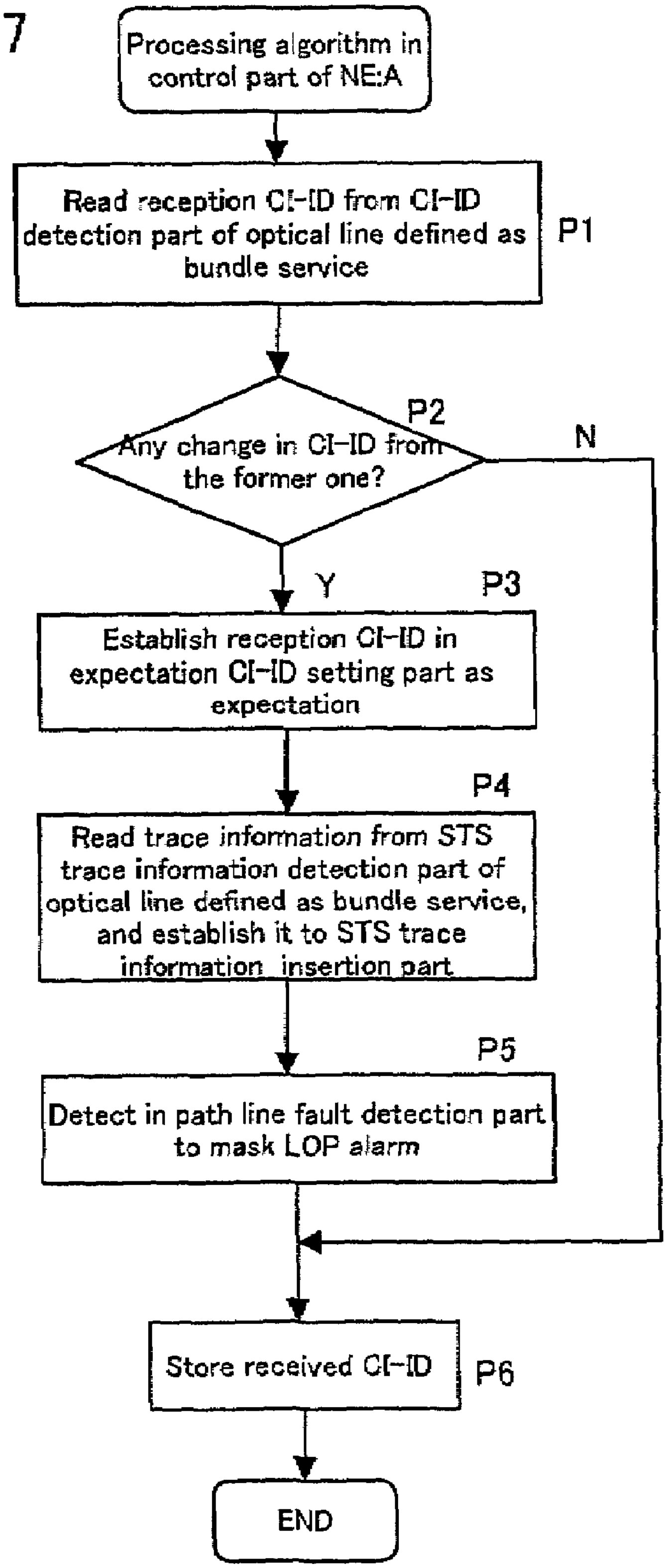
FIG. 7 is a flowchart in the embodiment showing a processing algorithm in a control part 50 of a transmitter NE: A shown in FIG. 3.

FIG. 7 is a flowchart showing a processing algorithm in the control part 50 of the transmitter NE: A shown in FIG. 3 according to the embodiment.

According to this embodiment, the CPU is mounted on the control part 50 of the transmitter NE: A, and the embodiment according to the present invention is executed by a program for controlling an execution by the CPU.

The following is the description in the case where the CI-ID in the OC12 optical line to be received from the IP unit D changes. Incidentally, actually, the IP unit D and IP unit E are subjected to a bidirectional communication, and for clarity of description, FIG. 7 shows an algorithm of only a unidirectional communication.

In FIG. 7, the received CI-ID is read-monitored by the CI-ID detection part 31 in order to judge presence or absence of a change from the IP unit D (processing step P1).

Next, the CPU of the control part 50 monitors in a polling cycle, and judges whether or not the CI-ID changes as compared with the former one (processing step P2). Incidentally, it is possible to generate an interruption into the CPU in the case where this processing is performed by a hardware, resulting that the CI-ID changes, without polling.

When the CI-ID changes (processing step P2: Y), the reception CI-ID is established in the expectation CI-ID setting part 32 as the expectation CI-ID (processing step P3). Next, the trace information of the optical line defined as the bundle service by the STS trace information extraction part 33 is read out, and is established in trace information insertion parts 61, 71 at a side of transmission of optical line parts 60, 70 (processing step P4). Here, the STS trace information is one to be sent as a definition of how to use by labeling each STS 1 as shown in FIG. 6C.

Next, an alarm (an abnormal alarm LOP: Loss of Pointer) generating by a transient fault state detected by a path fault detection part 41 is masked (processing step P5). That is, this is the case where the reception CI-ID disagrees with the expectation CI-ID, and as it is judged that this disagreement is not an essential line fault based on the STS trace information, the abnormal alarm is masked at the time of these conditions so as not to switch to a redundant circuit.

Furthermore, in the subsequent steps, in order to find out a change, the CI-ID received as the previous information is stored in a memory (not shown) (processing step P6).

FIG. 4 is a block diagram showing an example of the configuration of the transmitter NE: B in FIG. 2. Similarly to the transmitter NE: A, in the CI-ID detection part 31 at a side of reception of the optical line part 30 in the definitional band, the reception CI-ID is periodically monitored by the CPU of the control part 50.

In the case where it is judged that the reception CI-ID changes by comparing it with the CI-ID established in the expectation CI-ID setting part 32, the reception CI-ID is instantaneously re-established as the expectation CI-ID in the expectation CI-ID setting part 32.

Thus, as the normal data, a corresponding path line is relayed and transmitted to the basic transmission path through a transmission side of the optical line part 70.

Furthermore, when the bundle service is defined in advance, the STS trace information (the J1 byte in the SONET frame) transmitted from the terminal point (in FIG. 2, the IP unit D and IP unit E) in each STS1 of the band is stored in each of the control parts 50 of the transmitter NE: A, transmitter NE: B, and transmitter NE: C.

The STS trace information can be transmitted and received in STS1 unit, and in the STS3C/STS12C format, it is transmitted and received in the J1 byte of a heading frame in 3×STS1/12×STS1.

In FIGS. 3 to 5, the STS trace information extraction part 33 at a side of reception of the optical line reception part 30 extracts information from the corresponding J1 byte according to setting of the expectation CI-ID setting part 32. Such the extracted information can be monitored by the CPU of the corresponding control part 50.

The STS trace information insertion parts 61, 71 at a side of reception of the optical line transmission parts 60, 70 can overwrite information by the CPU of the corresponding control part 50. The STS trace information insertion parts 61, 71 determine a J1 byte position to be inserted according to the CI-ID transmitted by way of the cross-connection part 40.

In FIG. 2, in the case where the IP unit D changes the method for using the STS band in the OC12 interface, and annexes the CI-ID changed to the transmitter NE: A, and transmits the data, in FIG. 3, in the transmitter NE: A, the control part 50 monitors the CI-ID detection part 31, and confirms whether or not the changed optical line is defined in advance, and then re-establishes the changed CI-ID in the expectation CI-ID setting part 32.

In the CPU of the control part 50, as at this time, the LOP (Loss of Pointer) detected in the path fault detection part 41 is temporarily generated in the band in the bundle service, this fault is masked.

The reception side of the optical line part 30 annexes the changed CI-ID, and transmits the data to the transmitter NE: B. Furthermore, the control part 50 detects the bundle service STS trace information received from the IP unit D from the STS trace information extraction part 33, and transfers the information to the transmitter NE: B by way of the STS trace information insertion part 71.

In FIG. 4, in the same manner as in the transmitter NE: B also, the control part 50 monitors the reception CI-ID from the CI-ID detection part 31 at a side of reception of the optical line part 30.

The control part 50 simultaneously also monitors the STS trace information extraction part 33, and confirms that it is same with the trace information prior to the change of the CI-ID, and if within the bundle service band, the changed CI-ID is instantaneously established in the expectation CI-ID setting part 32.

Undergoing this procedure, it is possible to discriminate between the CI-ID change by an error cross-connection, etc. in another transmitter NE in the basic network 1 and the service change in the bundle service band.

The procedure transmitted from the optical line reception part 31 in the transmitter NE: B to the transmitter NE: C is also same with the transmission from the transmitter NE: A to the transmitter NE: B. In FIG. 5, in the same manner as in the transmitter NE: C, the control part 50 monitors the CI-ID detection part 31 in the band defined as the bundle service, and when it is changed and the STS trace information is not changed, the changed CI-ID is established in the expectation CI-ID setting part 32.

In the case where data different from ones received previously are received by the STS trace information extraction part 33 in the STS trace information, the setting is not performed by the expectation CI-ID setting part 32. As this result, the path fault detection part 41 detects the LOP alarm, and a switch part 80 selects a path of another route (a direction of the transmission path ac).

Here, the case where an intrinsic path line fault is detected will be explained. A PM error detection part 42 of each of the transmitters NE counts a bit error number in the path line in each minimum unit (to be detected from B3 byte in the SONET frame). At this time, when the IP unit transmits, the B3 byte (check code) to be used by calculation is generated interlocking with transmission data. Furthermore, the B3 byte is generated in each STS1 frame in the STS1, and one is generated with respect to the 3×STS1 frame in the STS3C, and one is generated with respect to 12×STS1 frame in the STS12C (these are in the SONET standard).

That is, remaining 2×B3 bytes in the STS3C and remaining 11×B3 bytes in the STS12C are transmitted as non-use.

The control part 50 of each transmit periodically (for example, 1 sec cycle) monitors the PM error detection part 42, and calculates an accumulated bit error number (CV) at 15 min/day according to a bit error number, an error generation section number (ES) at 15 min/day, and an error generation section number (SES) of a fixed value or over at 15 min/day, and in the case of being a fixed value or over in each register, it is notified to a maintainer (maintenance terminal 1) as TCA (threshold crossing alert).

The control part 50 of each transmitter NE can monitor the quality of the path line following an automatic change by interlocking with the monitor of the PM error detection part 42 according to the CI-ID judged as above (called a PM function).

Here, a B3 error insertion part 72 at a side of reception of the optical line part 70 in the transmitters NE: A and B shown in FIGS. 3 and 4 is an insertion function part of B3 byte which can change compulsorily the B3 byte to be used for the above PM error detection part 40.

The B3 error insertion part 72 can also insert the B3 byte in each minimum unit. A PM monitoring interlocked with the above automatic change is coupled with the B3 error insertion function, so that it is possible to confirm that the transmission band allocated to a specified service interface is justly cross-connected in the basic network 1.

In this example, the B3 error is inserted into the maintenance terminal I shown in FIG. 2, and the maintenance terminal I monitors TCA to be detected by the transmitter NE: B and transmitter NE: C and confirms it.

Figure 8:
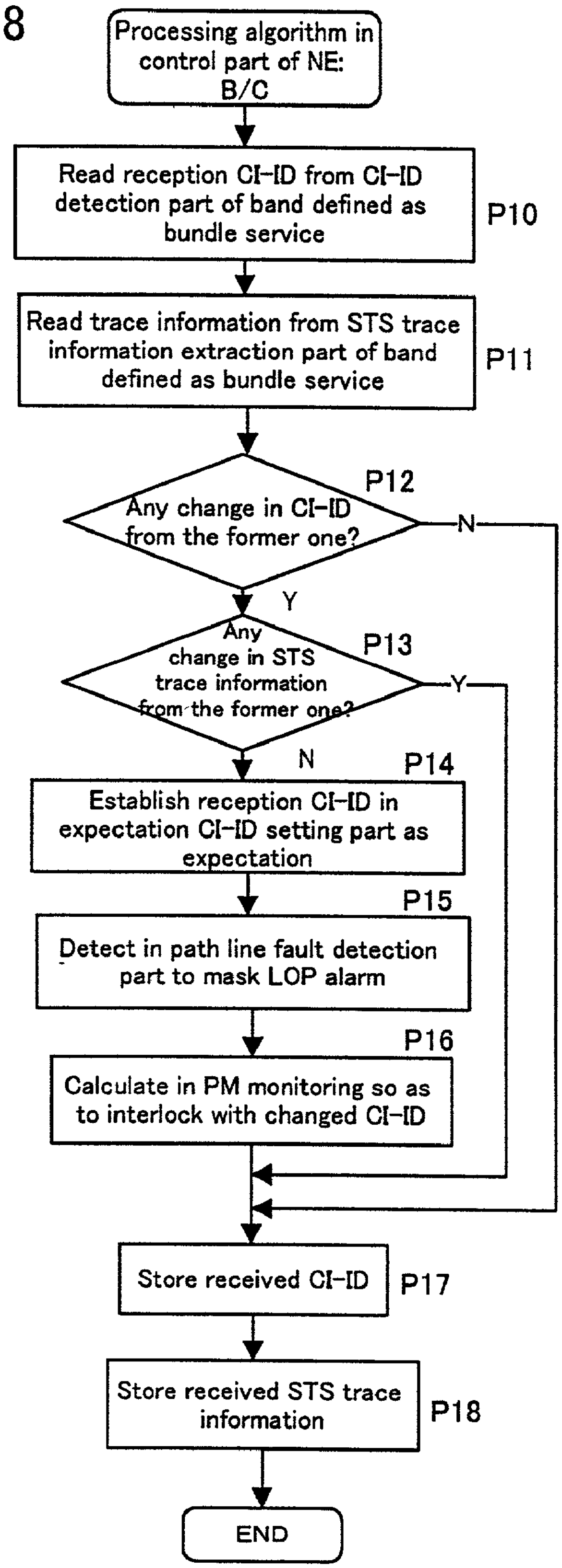
FIG. 8 is a processing algorithm of the control part 50 of transmitters NE: B, C.

FIG. 8 is a processing algorithm of the control part 50 of the transmitters NE: B, C. Similarly to FIG. 7, this shows an algorithm of only a unidirectional communication.

In FIG. 8, in order to judge presence or absence of a change from the transmitter NE: A in the transmitter NE: B and the IP unit D sent through the transmitter NE: B in the transmitter NE: C, the CI-ID detection part 31 at a side of reception of the optional line part 30 read-monitors the reception CI-ID (processing step P10).

Furthermore, the STS trace information extraction part 33 reads the STS trace information in the band defined as the bundle service (processing step P11).

Continuously, the CPU of the control part 50 monitors at a polling cycle, and judges whether or not the CI-ID has changed from the former one (processing step P12). Incidentally, in this case also, in the case where the processing is made not by the polling, but by the hardware and the change occurs, it is possible to generate an interrupt to the CPU.

In the case where the CI-ID changes (processing step P12: Y), and further the STS trace information has changed from the former one (processing step P13: Y), it is judged as a line fault. Accordingly, the received CI-ID is stored in the memory (processing step P17), and the received STS trace information is stored in the memory (processing step P18), and the processing is ended.

At the processing step P13, in the case where the STS trace information is same with the former one (processing step P13: N), as it receives the same IP unit D, the reception CI-ID is established in the expectation CI-ID setting part 32 as the expectation CI-ID (processing step P14).

At the processing steps P12, P13, the change of the service data and the error cross-connection are judged.

Next, the alarm (abnormal alarm LOP: Loss of Pointer) generated due to a transient fault state detected by a path fault detection part 41 is masked (processing step P15). Namely, even in the case where the reception CI-ID disagrees with the expectation CI-ID, as it is further judged that this is not an intrinsic line fault based on the STS trace information, the abnormal alarm is masked at the time of these conditions so as not to switch into the redundant line.

Furthermore, an error is detected by the PM error detection part 42, and the line quality is calculated interlocking with the changed CI-ID (processing step P16). At the processing step P16, after it is correctly judged that the band allocation in the bundle service changes due to the change of the CI-ID, the PM (error) calculation is processed in conformity with the change.

Next, the received CI-ID is stored in a memory (not shown) (processing step P17), and further the received STS trace information is stored in a memory (not shown) (processing step P18).

Incidentally, the processing steps P10 to P12 of FIG. 7 are configured by the hardware, and the CPU processing is activated by interrupting the change detection, whereby the transient state can further be realized in a short time.

As described above in accordance with the drawings, according to the transmitter of the present invention, in the same manner as in the maintenance and operation procedure of a conventional voice data transmission, it is possible to maintain and operate the IP data service transmission.

The conventional voice data and various services collecting IP data can be transmitted by the same transmitter. Furthermore, it is possible to decrease maintenance and operation costs according to the present invention.

What is claimed is:

1. Network equipment provided for a transmission line of a backbone network, within which a band is assigned for an IP data network, said network equipment comprising:

a detection part for detecting an identifier in received data from the IP data network for identifying a band use;

an identifier setting part for previously setting an identifier for identifying an expected band use; and a control part for monitoring the detection part and the identifier setting part in each minimum unit of a path line, wherein the control part periodically monitors the detected identifier for identifying the band use in a previously defined band, and when the detected identifier is different from the previously set identifier for identifying the expected band use, the control part resets the previously set identifier with the detected identifier for identifying the band use.

2. The network equipment according to claim 1, further comprising:

a fault detection part for detecting a path fault, wherein when the previously set identifier for identifying the expected band use is reset with the detected identifier an alarm of an LOP (Loss of Pointer) which is detected by the fault detection part is masked.

3. The network equipment according to claim 1, further comprising:

a fault detection part for storing trace information to be transmitted from a terminal point in each minimum unit of the path line, and for detecting a path fault of a change of use within the band or an error cross-connection according to presence or absence of a change of the trace information.

4. The network equipment according to claim 1, wherein the control part notices to a maintainer when an accumulated bit error number, an error generation second number, and an error generation second number of a fixed value or more in a predetermined period reach a predetermined value or over.

5. The network equipment according to claim 4, further comprising:

means for judging a bit error number of a path line according to the identifier for identifying a judged band use.

* * * * *